US005139404A

United States Patent [19]

Grau

[11] Patent Number: 5,139,404

[45] Date of Patent: Aug. 18, 1992

[54] APPARATUS FOR MAKING LINED PIPE

[75] Inventor: Thomas D. Grau, South Sioux City, Nebr.

[73] Assignee: International Pipe Machinery Corporation, Sioux City, Iowa

[21] Appl. No.: 681,930

[22] Filed: Apr. 8, 1991

Related U.S. Application Data

[62] Division of Ser. No. 378,566, Jul. 11, 1989, Pat. No. 5,028,368.

[51] Int. Cl.⁵ ........................ B28B 7/30; B29C 39/10; B29C 41/40

[52] U.S. Cl. .................................... 425/111; 249/152; 249/153; 249/178; 249/179; 425/125; 425/424; 425/432; 425/438

[58] Field of Search ................ 249/152, 153, 178-183; 425/111, 125, 424, 438, 432, 470

[56] References Cited

U.S. PATENT DOCUMENTS

| | | | |
|---|---|---|---|
| 1,299,542 | 4/1919 | Bower et al. | 249/180 |
| 2,315,634 | 4/1943 | McCall | 249/179 |
| 2,878,545 | 3/1959 | Lowe | 249/179 |
| 2,966,714 | 1/1961 | Eways et al. | 249/152 |
| 3,570,802 | 3/1971 | Miller | 249/179 |
| 3,656,732 | 4/1972 | St. John | 249/179 |
| 4,032,282 | 6/1977 | Wilson et al. | 249/181 |
| 4,042,315 | 8/1977 | Ottmann et al. | 249/179 |
| 4,134,569 | 1/1979 | Peppel | 249/179 |
| 4,153,232 | 5/1979 | Burchett | 249/179 |
| 4,582,275 | 4/1986 | Ives | 249/179 |

FOREIGN PATENT DOCUMENTS

| | | | |
|---|---|---|---|
| 467603 | 3/1975 | U.S.S.R. | 249/179 |
| 1368178 | 1/1988 | U.S.S.R. | 249/179 |

*Primary Examiner*—Jay H. Woo
*Assistant Examiner*—Khanh P. Nguyen
*Attorney, Agent, or Firm*—Baker & McKenzie

[57] ABSTRACT

An apparatus for making concrete pipe having vinyl liners. An expandable core is used to hold a tubular vinyl liner. The core has over-center latches which lock the core in an expanded position to hold the liner against the outside surface of the core. The core is a flexible and expandable shell which can be deformed by a forming module into an exact desired shape prior to placing concrete arount the liner and the core. The liner and core are inserted along with a reinforcing cage into a dry-cast concrete form. Then the form is placed over the module and the module is actuated into engagement with the inside surface of the core. The module has a series of disc assemblies, each of which has a plurality of radially moveable shoes capable of being moved to expanded and retracted positions. The form is filled and immediately taken off the module. The form is immediately stripped, but the core is kept in contact with the liner to hold the liner in engagement with the concrete until the concrete sets sufficiently so that a complete bond between the liner and the concrete is established. Finally, the core is retracted and removed from the finished lined pipe.

11 Claims, 7 Drawing Sheets

Fig. 9.
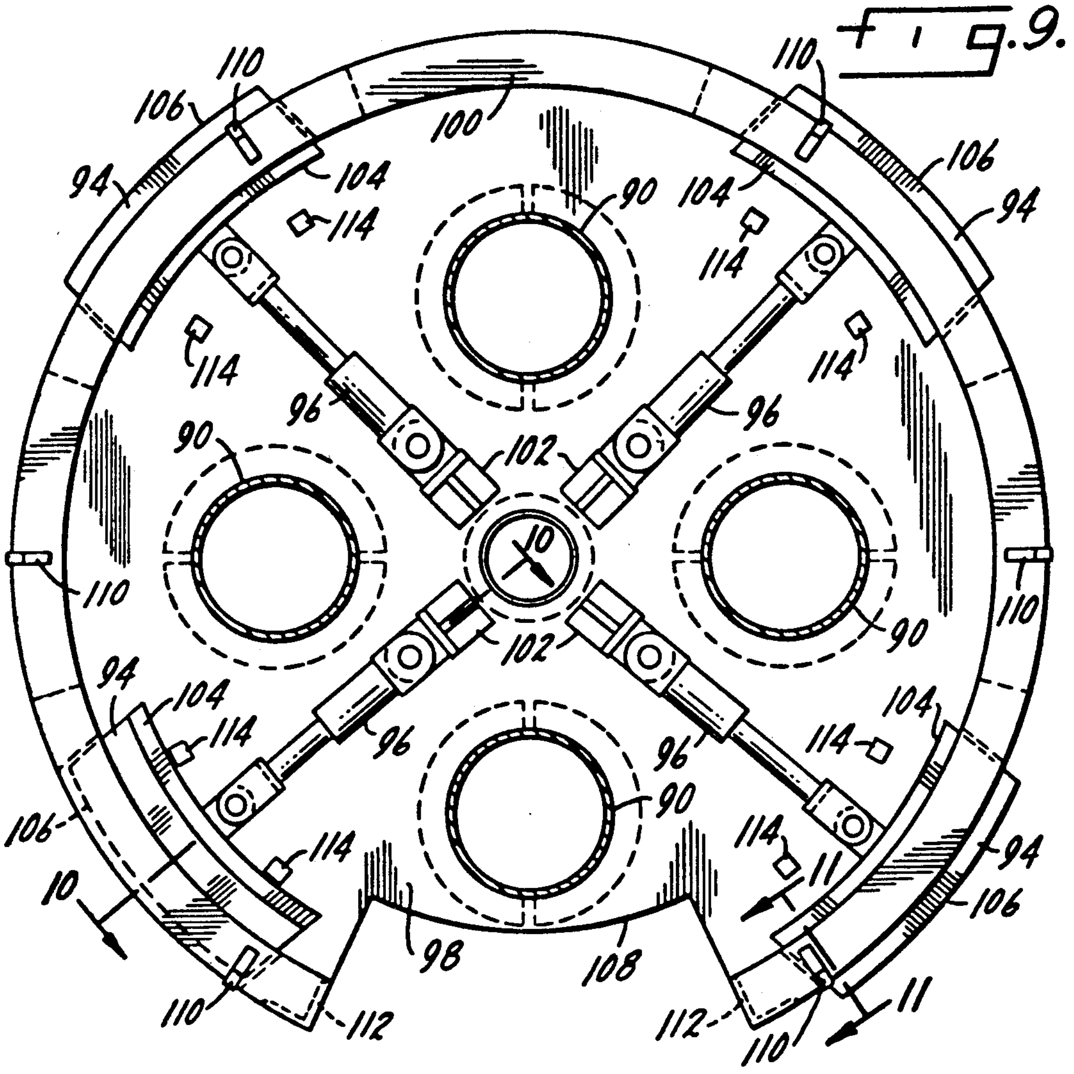
Fig. 10.
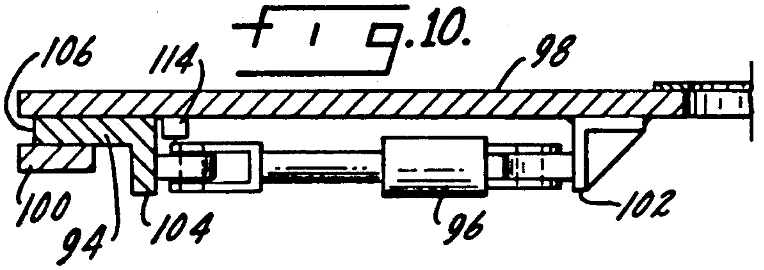
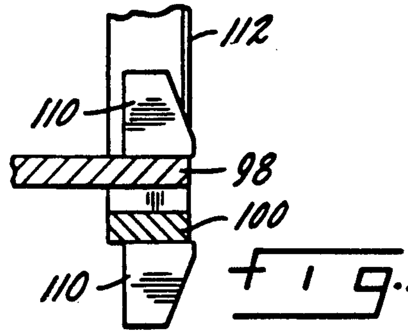
Fig. 11.

APPARATUS FOR MAKING LINED PIPE

This is a division of application Ser. No. 378,566, filed Jul. 11, 1989, now U.S. Pat. No. 5,028,368.

BACKGROUND AND SUMMARY OF THE INVENTION

The present invention relates to a method and apparatus for making lined concrete pipe sections. The invention relates specifically to a way of ensuring that a proper bond is formed between the concrete and the liner of lined concrete pipe section.

Vinyl liners have been used in the manufacture of concrete pipe sections for many years. The vinyl materials used for this purpose is usually composed of high molecular weight vinyl chloride resin with chemical resistant pigments and plasticizers. The material is extruded in sheets. Ribs project from one side and the opposite side is smooth. The ribs are T-shaped and are designed to be embedded in and positively engage the inside wall of a concrete pipe section. The extruded vinyl sheet has a low co-efficient of friction. Therefore, even though the ribs are shaped to engage and retain the liner in close contact with the concrete, it is generally difficult to obtain a good bond because of the nature and texture of the extruded vinyl.

A good bond between the vinyl and the concrete is important to prevent inward collapse of the liner which could result in pipe blockage. Also, a good bond will protect the interface between the vinyl and the concrete from deterioration. In addition, a good bond will resist groundwater pressure created by water on the back of the liner.

One way to achieve a proper bond is to wet cast concrete around a well supported liner and wait a substantial length of time before removing the liner supports. Such wet cast methods are effective but slow and, therefore, expensive.

Attempts have been made to apply dry cast pipe forming techniques to make lined pipes. The short turnover of forming equipment used in dry cast methods is desirable because such equipment can be costly to purchase or rent. However, the texture and bonding characteristics of dry cast concrete mixtures make it difficult to obtain a good bond in short periods of time.

A known dry cast technique uses a non-expandable core around which the liner is loosely fitted. Retaining rings are used to hold the liner in contact with the core as the dry cast concrete is placed into a form and around the liner. However, in order to completely fill the form, the retaining ring must be removed, leaving the liner unsupported. As the core is lifted away from the liner, radial supports are installed to hold the liner in contact with the hardening concrete. However, the radial supports do not fully support the liner and prior to their installation, the liner is substantially unsupported.

In another known system, an expandable core is permanently located at and is part of a stationary form. The liner is initially attached to a carrying cartridge which allows the liner to be placed onto the expandable core at the forming station. The core is expanded hydraulically to support the liner. Dry mix concrete is then placed around the liner/core assembly, while the core is radially expanded. However, since the expandable core is permanently located at the forming station, it is impractical to wait a sufficient period of time to ensure a proper bond at the concrete/liner interface. Another problem with this system is the difficulty of making sure that the radially expanding core is properly shaped to meet pipe design specifications for roundness. The spiral nature of its expansion makes ensuring roundness difficult.

Both of the above described methods for making vinyl lined concrete pipe using the dry cast method have significant problems relating to both cost and quality.

It is therefore an object of the present invention to provide a method for making lined pipe of high quality at low cost.

Another object of the present invention is to provide a method of using dry cast concrete techniques to form lined pipe rapidly without sacrificing quality.

Still another object of the present invention is to provide a method of using dry cast forming techniques to make lined concrete pipe which has proper roundness.

Yet another object of the present invention is to provide a method of forming lined concrete pipe in which the lining is thoroughly bonded to the concrete.

A further object of the present invention is to provide an apparatus which can be used to quickly make lined concrete pipe which has excellent roundness and which has an excellent bond between the lining and the concrete.

These and other objects are achieved with a method of making lined concrete pipe sections in which a liner is placed around an expandable and moveable core. The core is placed over a module which causes the core to deflect to a round cylindrical shape. Reinforcing material and an outer form are placed over the liner/core/-module assembly, and the form is filled with dry mix concrete. After vibrating the concrete into its final position, the form/liner/core assembly is lifted from the module. The core can remain in full contact with the liner to prevent any delamination of the liner from the concrete during stripping of the outer form and during subsequent curing of the concrete. Importantly, the stripping and curing with the core in place can occur at a location remote from the module. The module, therefore, and the form filling and vibrating equipment can be used frequently without any sacrifice in liner-to-concrete bond quality. In addition, pipes made in such a manner will have the excellent quality provided by centering and shaping functions of the module.

BRIEF DESCRIPTION OF THE DRAWINGS

The objects and advantages of the invention will be better understood upon a reading of the following specification, in conjunction with the accompanying drawings wherein:

FIG. 9 is a sectional view taken along line 9—9 of FIG. 1; and FIG. 10 is a sectional view taken along line 10—10 of FIG. 9; and FIG. 11 is a sectional view taken along line 11—11 of FIG. 9.

DETAILED DESCRIPTION OF THE INVENTION

Figure 1:
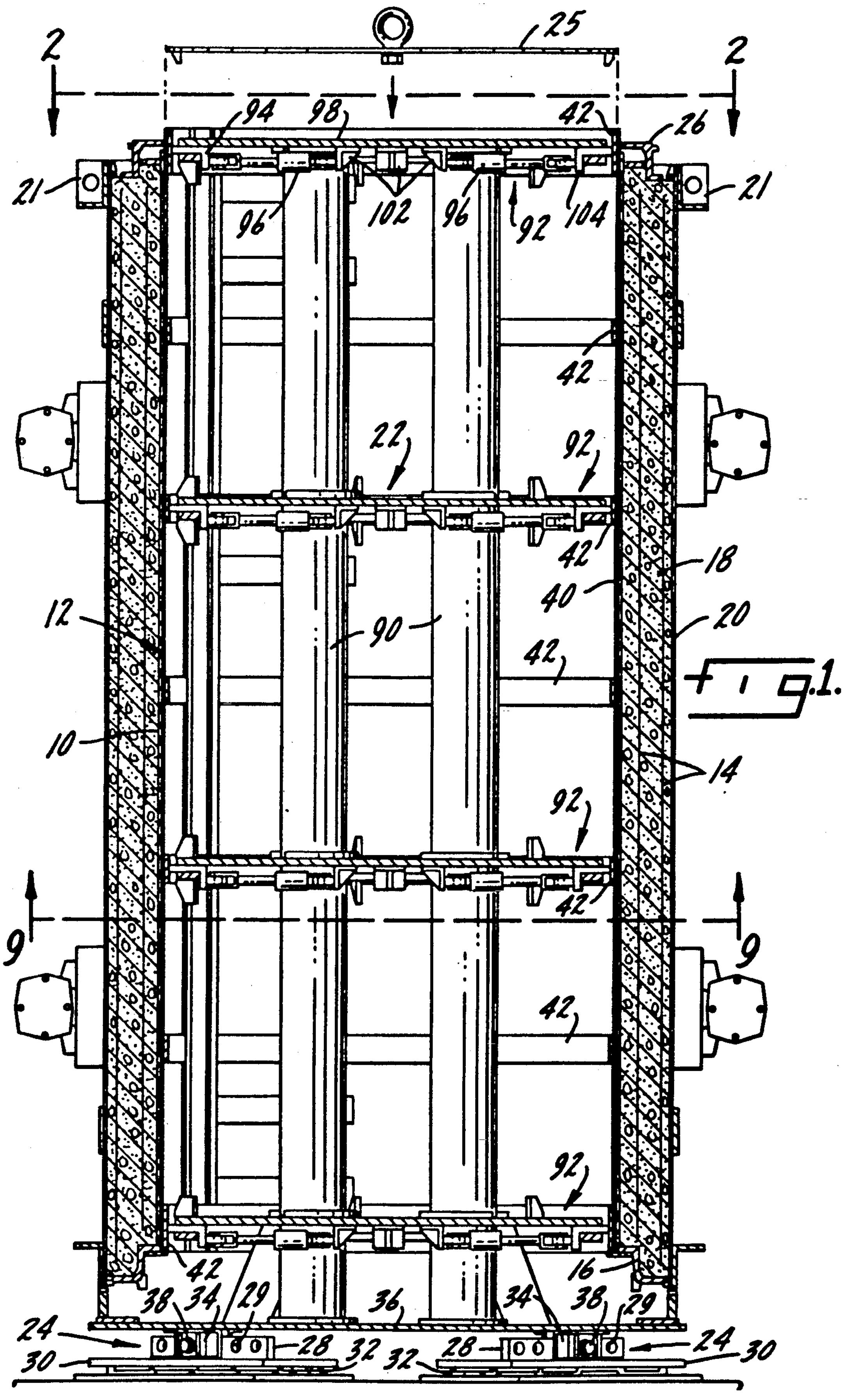
FIG. 1 is an elevational view in partial section of the apparatus of the present invention.
Figure 2:
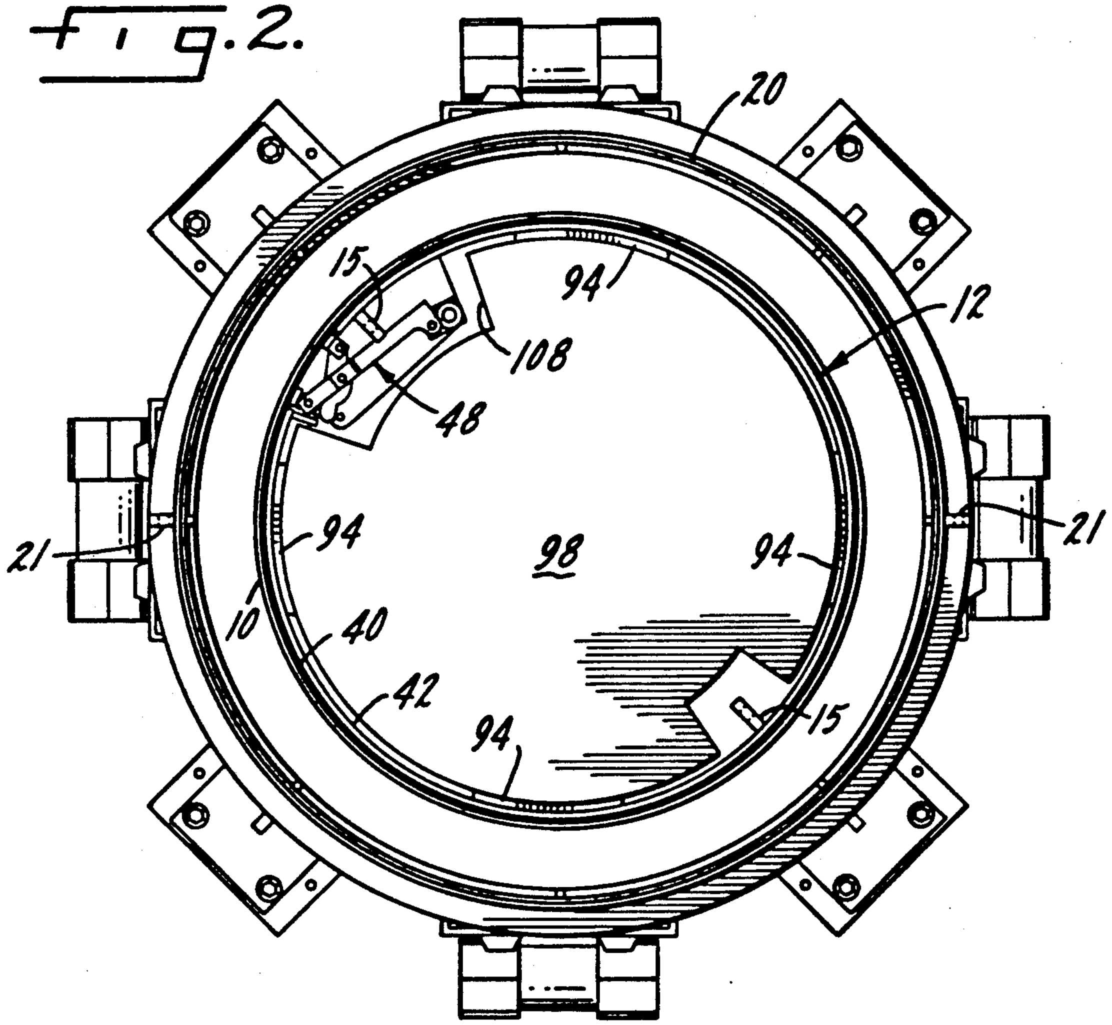
FIG. 2 is a top plan view taken along line 2—2 of FIG. 1.

FIGS. 1 and 2 show a complete assembly of the components used in an apparatus of the present invention. The PVC liner 10 is held by the cylindrical core 12. The core 12 is in turn held in place by the module 22, which is mounted to module supports 24. The space between the form 20 and the liner 10 is filled with concrete 18 and a cage comprised of reinforcing 14. The pallet 16 enables the form and core to be lifted in unison on and off the module 22. A cover plate 25 is used during filling of the form to prevent concrete from coming into contact with the module 22. Lifting fixtures 21 are located near the top outer edge of the form 20 to enable the assembly shown in FIG. 1 to be lowered on and lifted off of the module 22 by an overhead crane. Similarly, lifting fixture 15 located on the upper inside surface of the core 12 enable the core to be transported by a crane. A header 26 is used to form the upper surface or top joint of the concrete 18. Further details of the module 22 are discussed below with respect to FIGS. 8 through 11. Similarly, details of the cylindrical core 12 are discussed below with reference to FIGS. 3 through 7.

As shown in FIG. 1, the module supports 24 are each comprised of a plate 28 with holes 29 for accommodating modules of different sizes. The plates 28 are rigidly attached to horizontally planar base members 30, which in turn rest on isolators 32 intended to limit the transfer of vibratory forces to the ground during vibration of the concrete 18. The brackets 34, which are rigidly attached to the module base 36, straddle the apertured plate 28. Changeover pins 38 enable modules of different sizes to be carried by the module supports 24.

Figure 3:
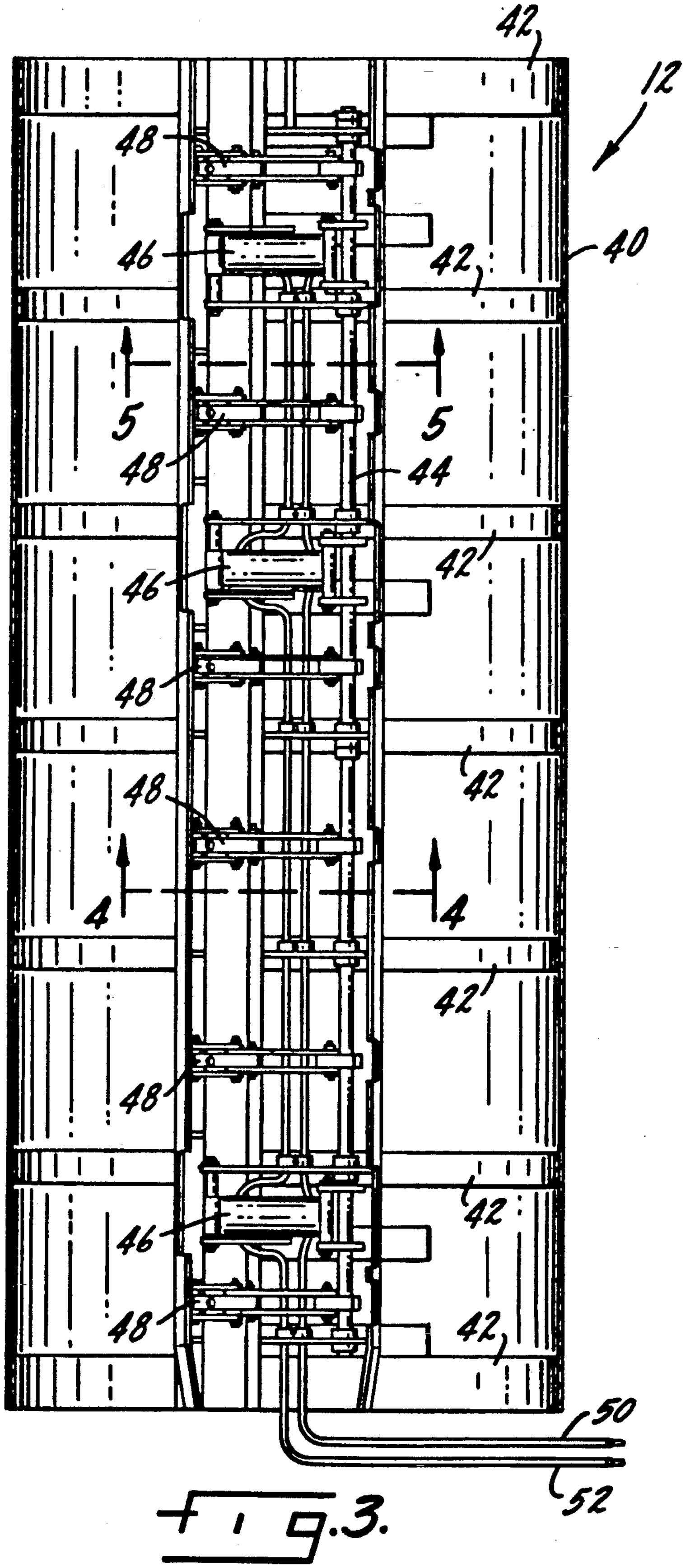
FIG. 3 is a longitudinal sectional view of an expandable core of the present invention.

FIGS. 3 through 7 (and FIG. 1) show the details of the cylindrical core 12. FIG. 3 is a longitudinal section through the core 12 showing the shell 40 reinforced by straps 42 at generally equal intervals along length of the inside of the shell. A main operating shaft 44 extends substantially the full length of the core 12. The shaft 44 transfers forces generated by the three collapsing cylinders 46 to the latches 48. The cylinders 46 and the latches 48 cooperate to cause expansion and retraction of the cylinder 12.

Details of the operations of the cylinders 46 and latches 48 are shown in FIGS. 4 through 7. Generally, the expansion and retraction of the cylindrical core 12 enables the liner to be draped around the core when the core is in the retracted (smaller diameter) position. With the liner in position around the core, the cylinders 46 are actuated to cause circumferential and diametric expansion of the cylindrical core. In the embodiment shown, the approximately 60 inch diameter core has a differential in circumference between the retracted and expanded position of about 3½ inches, resulting in a diametric expansion of approximately 1 inch. Such differential is sufficient to enable the flexible liner to be easily and quickly draped over the core. A second function of the retractability of the core relates to the point in time when the concrete has hardened sufficiently to provide a complete bond between the concrete and the liner. At such time, the core can be retracted and lifted out of the finished pipe.

In the arrangement shown in FIG. 3, the cylinders 46 are operated through common pneumatic lines 50 and 52 to ensure simultaneous movement thereof.

Figure 4:
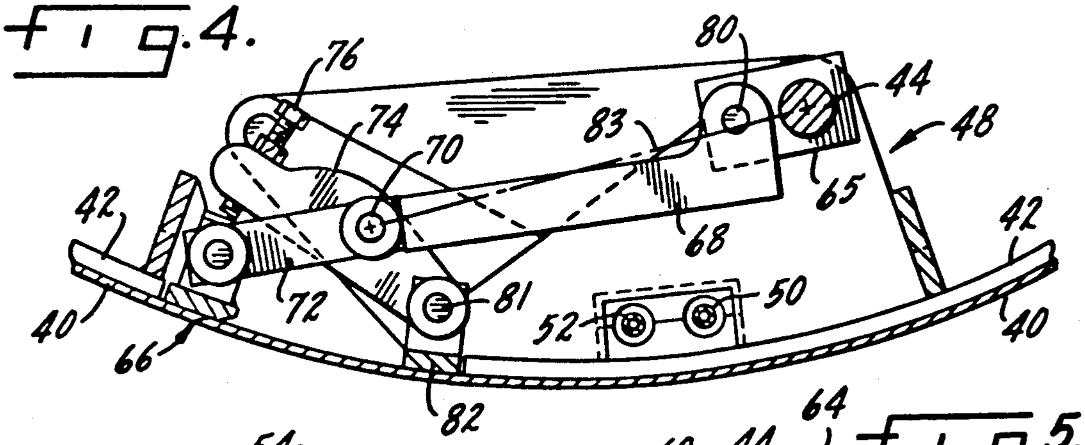
FIG. 4 is a sectional view of the core shown in FIG. 3 taken along line 4—4 of FIG. 3.
Figure 5:
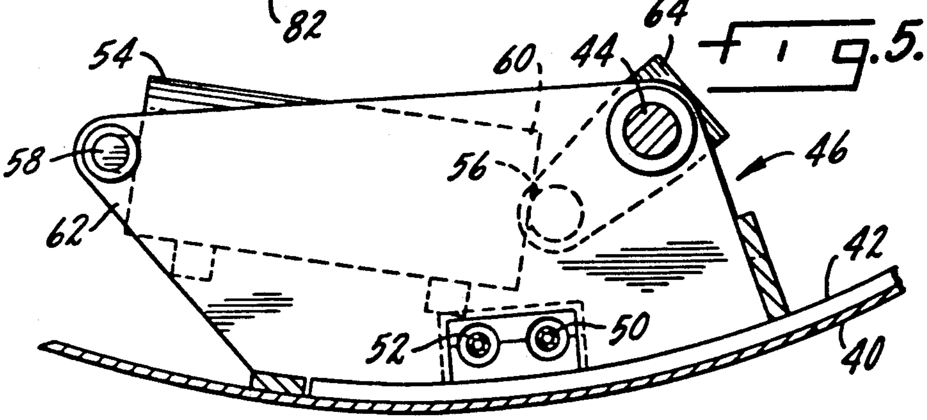
FIG. 5 is a sectional view of the core shown in FIG. 3 taken along line 5—5 of FIG. 3.

FIGS. 4 and 5 show the positions of the latches 48 and cylinders 46 when the core is in the expanded position. In order to obtain a full expansion of the shell 40, the cylinder assembly 46 is moved to its shortest position, see FIG. 5. The cylinder assemblies 46 are each comprised of a cylinder housing 54, a rod 56 extending from the housing, a pivoting end 58 and a translating end 60. The pivoting end 58 is pinned to a support gusset 62, which is rigidly connected to the shell 40 on one side of the seam 66. The rod 56 is pivotably connected to an arm 64, which is rigidly connected to the main shaft 44.

Figure 6:
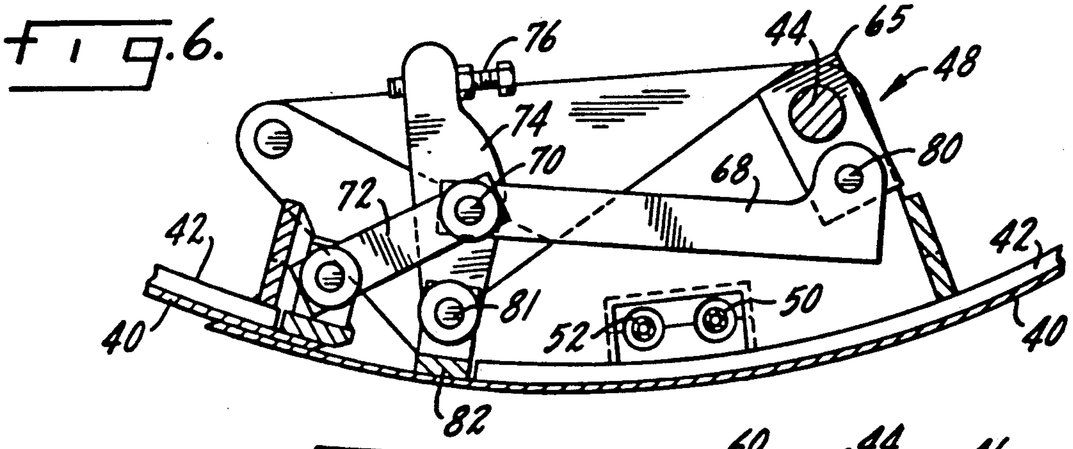
FIG. 6 is a sectional view of the latching mechanism shown in FIG. 4, with the mechanism shown in the unlatched position.
Figure 7:
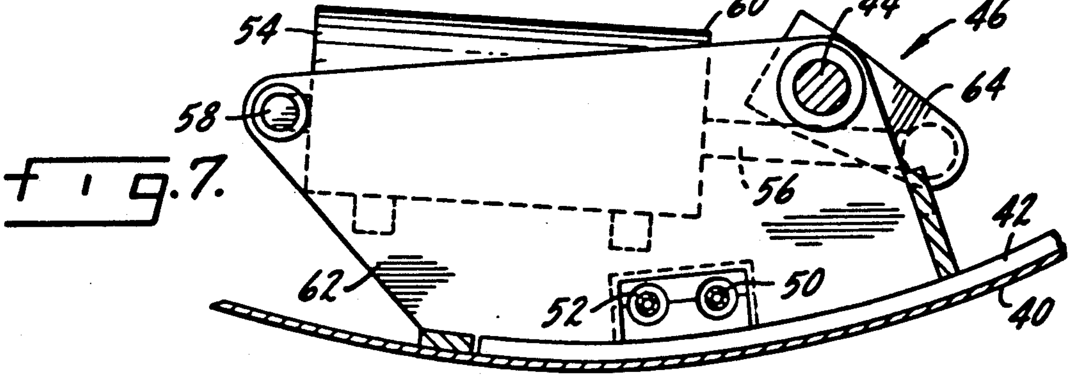
FIG. 7 is a sectional view of the actuating mechanism shown in FIG. 5, with the actuating mechanism shown in its extended position corresponding to the position of the latch of FIG. 6.
Figure 8:
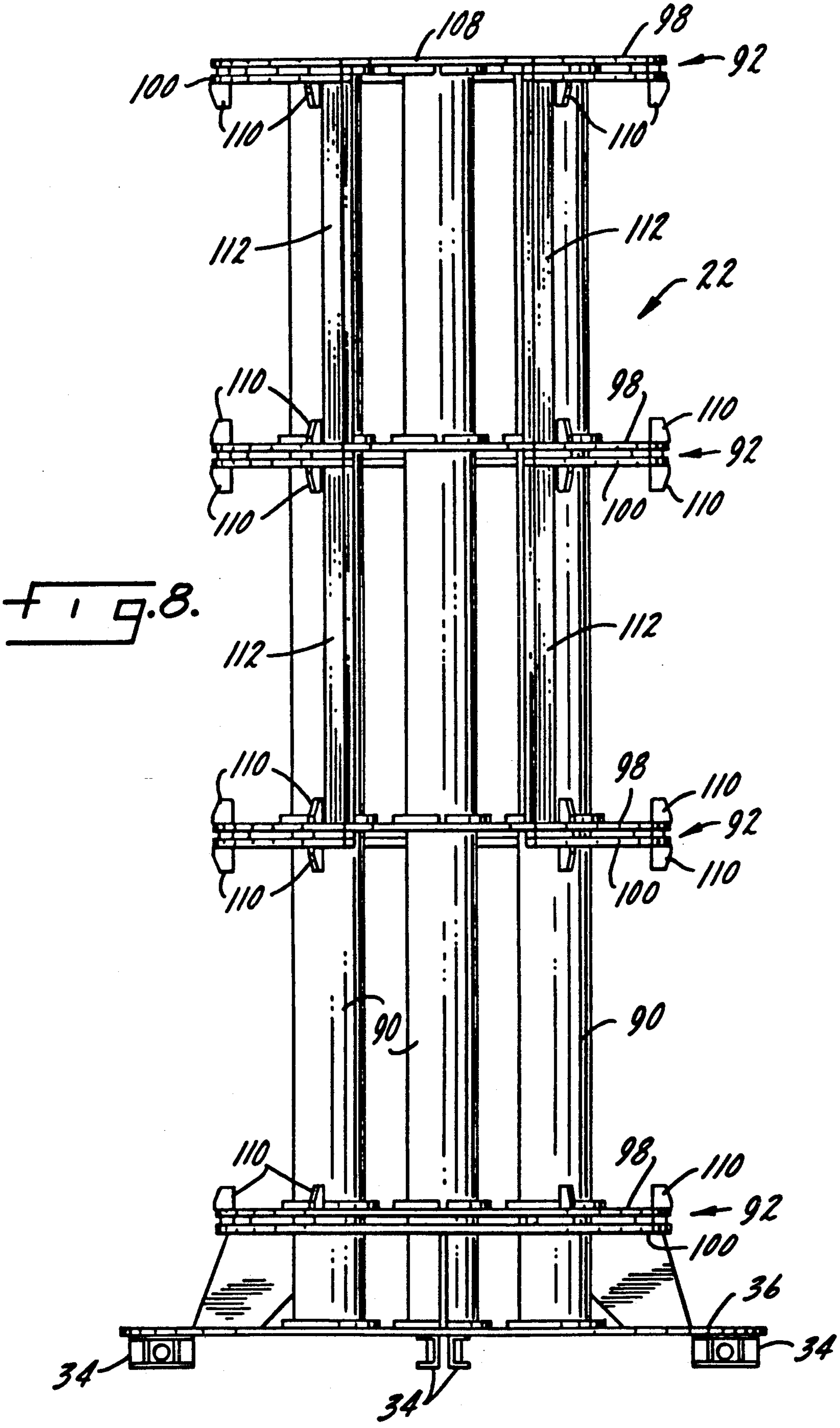
FIG. 8 is an elevational view of a module used in the present invention.

With reference to FIGS. 4 and 6, the latches 48 are comprised of several links which are operated by rotation of the main shaft 44. From the main shaft 44 there extends a short arm 65 rigidly connected to the shaft 44. The arm 65 is pinned with pin 80 to one end of an L-shaped link 68. A main latching pin 70 connects the other end of the link 68 with the center of an adjustable pivoting arm 74. The main latching pin 70 also connects the link 68 to one end of the bridging link 72. The adjustable pivoting arm has a free end to which is attached an adjusting bolt 76. The bridging link 72 is pivotably connected to a section of the shell near the seam 66, but on the opposite side of the seam from the point at which the adjustable pivoting arm is connected to the shell. The adjustable pivoting arm 74 is connected to the shell 40 by a pin 81 and mounting block 82.

As the main shaft 44 rotates (counterclockwise in FIGS. 4 and 5), as a result of actuation of the cylinders 46, the L-shaped arm 68, the bridging link 72 and the adjustable pivoting arm 74 move from a locked over-center position, shown in FIG. 4 to an unlocked position shown in FIG. 6. In the locked over-center position, the shell 40 has its maximum circumference and diameter, while in the unlatched position, shown in FIG. 6 the shell 40 has its minimum circumference and diameter. The over-center nature of the latches 48 arises from the fact that forces tending to collapse the shell from its expanded position, shown in FIG. 4, tend to rotate the main shaft 44 in a clockwise direction (as shown in FIGS. 4 and 5). However, as can be seen in FIG. 5, such clockwise rotation of the main shaft 44 is prevented due to the interference between the arm 64 and the cylinder 60. The pin 80 by which the L-shaped arm 68 is connected to the arm 65 lies just beyond an imaginary line 83 between the center of the main latching pin 70 and the center of the main shaft 44.

FIGS. 8 through 11 (and FIG. 1) show the module 22 of the present invention. As discussed above, the purpose of the module 22 is to impart roundness to the cylindrical core 12 during formation of lined concrete pipes in accordance with the present invention. The module 22 is a hydraulically operated apparatus in which four main tubular columns 90 support four disc assemblies 92 spaced along the length of the columns 90. Each disc assembly includes four radially spaced shoes 94. Each shoe 94 moves radially inwardly and outwardly from the longitudinal axis of the module, and each shoe is operated by its own hydraulic cylinder 96. Each disc assembly 92 is comprised of a main support plate 98, lower shoe supports 100, and cylinder supports 102. The cylinders 96 have one end attached to the cylinder support 102 and the other end attached to a vertical lip 104 formed on the inside portion of the shoe 94. Each shoe 94 has an outer contact surface 106. The outer contact surfaces 106 of the shoes of a particular disc assembly combine to define four generally equidistant segments of a right circular cylindrical surface. The discs 98 and shoe supports 100 substantially prevent movement of the shoes in a direction parallel to the axis of the module 22.

Each of the disc assemblies 92, including the main support plates 98, have a large opening 108 at the periphery thereof. The large openings 108 of the several disc assemblies are in axial alignment to provide space for the cylinders 46 and latches 48 of the core 12. Angle supports 112 connect the corners of the upper three main support plates at the location of the openings 108. The cylinders 46 and the latches 48 of the core 12 have been designed to project a minimum distance inwardly from the inside surface of the core 12 to minimize interference between the components of the core and the components of the module.

Each of the cylinders 96 of the entire module 22 are operated from a single hydraulic fluid source in order to achieve substantially simultaneous movement of the shoes 94. However, for purposes of illustration, one of the shoes and its associated cylinder, the one also shown in FIG. 10, is shown in its retracted position, while the remaining three shoe/cylinder assemblies at that level are shown in the extended position. In order to prevent any damage or asymmetrical distortion to the cylindrical core 12, the shoes 94 are designed so that the contact surfaces 106 project a limited and predetermined distance radially outwardly from the main support plates 98 and the lower shoe supports 100. This is accomplished by limiting the outward movement of the shoes 94 by providing interference between the vertical lip 104 and the lower shoe support 100. The lower shoe support 100 acts as a stop with respect to the outward movement of the shoe 94. Stop blocks 114 limit inward movement of the shoes 94.

The axial positions of the disc assemblies and the shoes 94 is selected so that the contact surfaces 106 of the shoes 94 bear against the reinforcing straps 42 attached to the inside of the core 12. Such alignment can be best seen in FIG. 1. However, because the straps 42 project inwardly from the inside surface of the core, each of the discs is provided with a plurality of guides 110 which prevent the straps 42 from catching on the main support plates 98 and the lower shoe supports 100 as the core 12 is lowered onto the module 22. The angle support 112 also prevents the cylinder and latch components of the module from interfering and catching the main support plates in the event that the core tends to rotate as it is placed over the module.

Use and Operation

Figure 12:
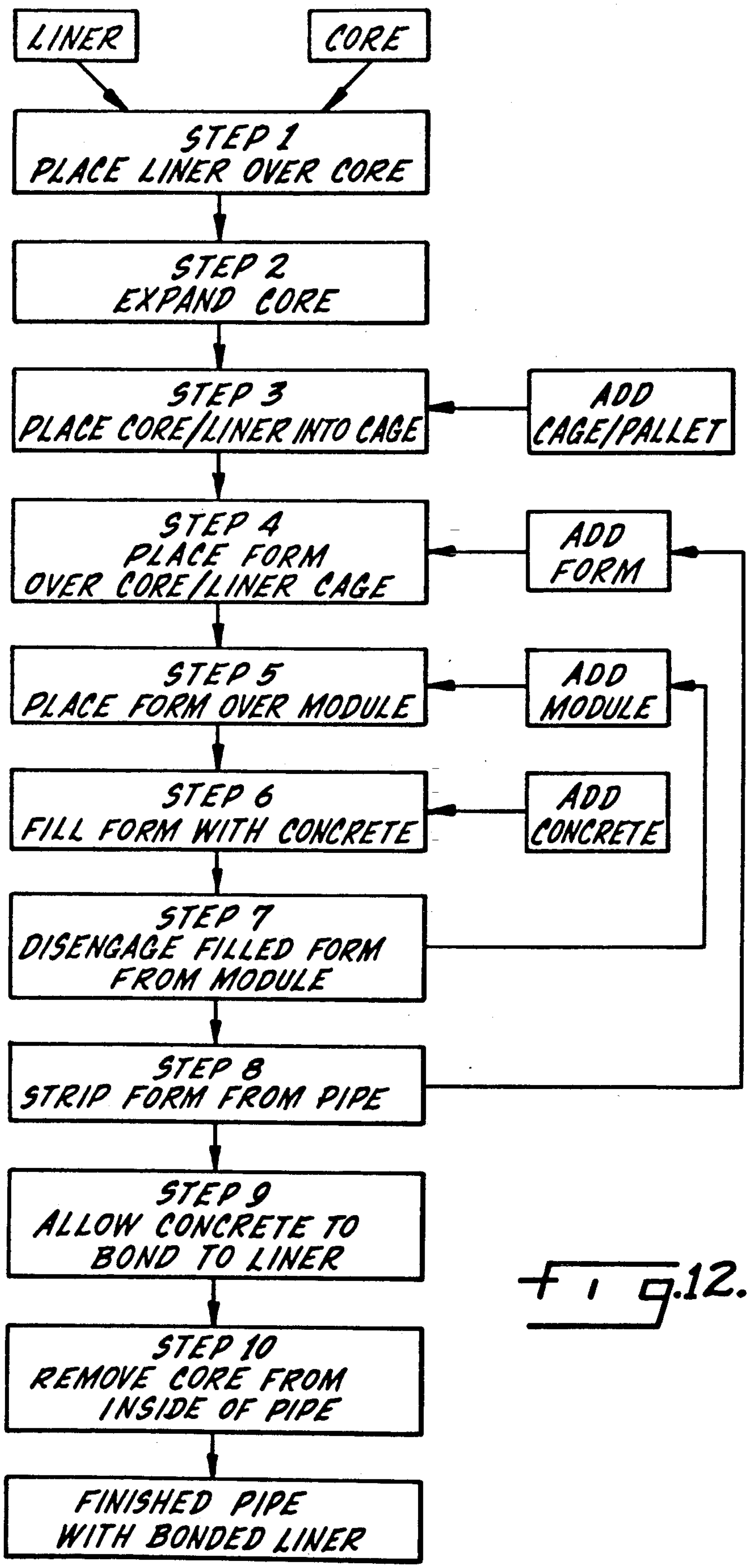
FIG. 12 is a block diagram of the steps involving the process of the present invention.

FIG. 12 is a block diagram showing the several steps of the present invention. In making a lined pipe in accordance with the present invention, Step 1 is to place a liner, preferably made of polyvinylchloride, such as T-Lock PVC sheet liners sold by Ameron Protective Coatings Division, over a moveable and expandable cylindrical core. In Step 2, the core is then expanded into snug frictional engagement with the tubular liner. In order to obtain the tight fit between the core and the liner, the liner may be constructed out of a sheet, or a plurality of sheets, in which the longitudinal edges thereof have been fastened together by solvent welding or other techniques to form a cirumferentially continuous flexible tubular liner. The liner may be constructed of a 270° ribbed section and a 90° insert panel attached together along their longitudinal edges. Ribs should be disposed on a substantial portion of the outer surface of the liner in order to mechanically engage concrete which is placed around the liner.

Referring again to the block diagram of FIG. 12, Step 3 is to lower the liner and expanded core into a cage/pallet assembly. The cage/pallet assembly is comprised of concrete reinforcing in the form of inner and outer cylindrical members carried by a pallet. Lifting devices formed at the upper end of the core enable the core/liner assembly to be lifted into the cage/pallet.

In Step 4, an empty form, such as one which is typically used in dry cast concrete forming, is placed over the core/liner/cage and attached to the pallet. Secure connection between the pallet and the form enable the entire assembly, which includes the core, the liner, the cage, and the form, to be lifted by a crane and placed on a module like the one shown in FIG. 8. Generally, the module is used to ensure the roundness of the core/liner assembly. In Step 5, the fully prepared form is placed over the module and the module is actuated into engagement with the inside surface of the core to move the core and liner into a nearly perfectly cylindrical shape and to hold that shape during vibration of the concrete as the concrete is placed into the form.

Step 6 is to fill the form with dry-mix concrete. Since the dry-mix concrete sets very quickly, the concrete has sufficient strength to prevent any distortion of the core upon release of the module and removal of the filled form therefrom (Step 7). However, localized bonding between the liner and the concrete takes a longer period of time than structural set of the concrete. Therefore, the module may be disengaged from the filled form, and the form may be lifted from the station at which the module is located without any loss of roundness of the formed pipe. Again, because of the quick set of dry-mix concrete, the form can be immediately stripped from the concrete (Step 8). However, still further support must be provided to the liner pressing it into engagement with the concrete in order to obtain an optimal concrete/liner bond (Step 9). The time required for such bond will depend upon the particular components used in the dry-mix concrete, the ambient temperature, and other factors. However, such curing time to obtain proper liner/concrete bond can be achieved without utilizing either the form or the module. While a core is required to be in use for such curing time, the form and module may be re-used to manufacture other additional lined pipes. Finally, the core is removed from the inside of the cured pipe (Step 10), and the pipe is ready to be shipped.

The method and apparatus of the present invention have been described with reference to a single embodiment. It should be recognized that numerous alternatives, modifications and variations of the invention may be devised without departing from the spirit and scope of the following claims.

I claim:

1. An apparatus for dry casting lined concrete pipe sections comprising:

core means for retaining a liner material in a generally cylindrical shape, said core means being transportable from one location to another, lateral expansion means for radially expanding said core means into engagement with said liner, said lateral expansion means comprising a module having deformation means for deforming said core means into a substantially round cylindrical shape, said deformation means including a plurality of sets of radially moveable deforming elements carried by said module, said elements being capable of moving from a retracted position to an extended position into and out of engagement with said core means.

2. An apparatus in accordance with claim 1 wherein: said elements are operable by pressurized fluid.

3. An apparatus in accordance with claim 1 wherein: said plurality of elements are a plurality of sets of four elements, each set being held in place by a pair of discs, said sets being disposed along a longitudinal axis of said module.

4. An apparatus in accordance with claim 1 wherein: said elements in said extended position define a right circular cylinder.

5. An apparatus in accordance with claim 1 wherein: said core means is a core substantially open, the inside surface of said core being generally fully accessible.

6. An apparatus for use in making dry cast lined concrete pipe comprising: a base, at least one elongated main support extending from said base, lateral expansion means disposed along said support, said lateral expansion means including a plurality of deforming assemblies spaced axially along said main support for engaging a plurality of locations on the inside surface of a generally tubular core and for bringing said tubular core into a predetermined shape, each said deforming assembly including a plurality of at least three radially moveable deforming elements.

7. An apparatus in accordance with claim 6 wherein: said deforming assemblies each comprise a disc assembly having a generally flat plate, said deforming elements being carried by said plate.

8. An apparatus in accordance with claim 7 wherein: said deforming elements are arcuate and have outer surfaces which define said predetermined shape, said elements being moveable radially inwardly and outwardly relative to a central axis of said apparatus.

9. An apparatus in accordance with claim 8 wherein: said predetermined shape is a cylinder, and said plurality of elements is four.

10. An apparatus in accordance with claim 9 wherein: said deforming assemblies are generally equally spaced along said elongated main support.

11. An apparatus in accordance with claim 6 wherein: said base includes isolation means for limiting the transfer of vibrations from said apparatus to a surface upon which said apparatus is placed.

* * * * *